UNITED STATES PATENT OFFICE.

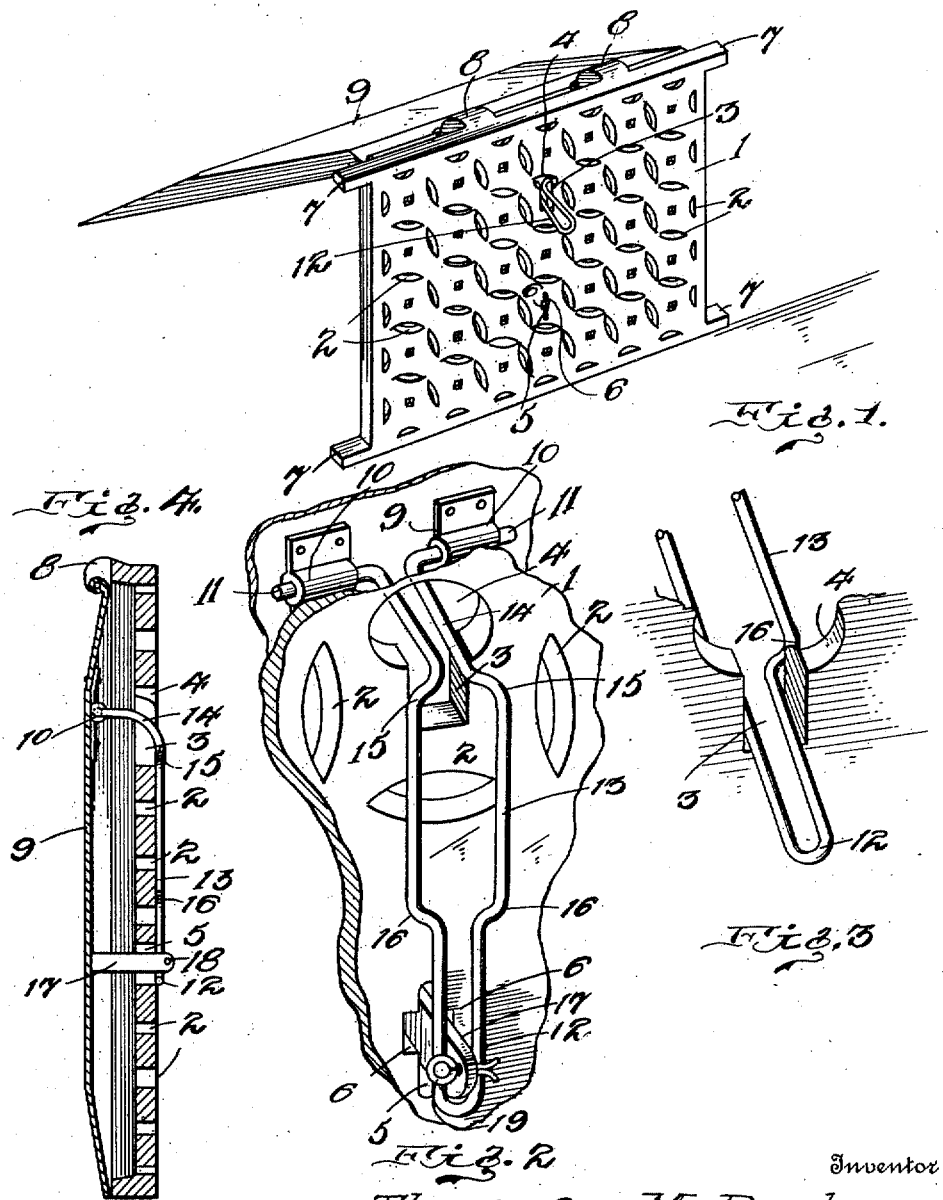

THOMAS MARTIN BARBEE, OF OWENSBORO, KENTUCKY.

VENTILATOR.

985,244. Specification of Letters Patent. Patented Feb. 28, 1911.

Application filed July 18, 1910. Serial No. 572,513.

*To all whom it may concern:*

Be it known that I, THOMAS MARTIN BARBEE, a citizen of the United States of America, residing at Owensboro, in the county of Daviess and State of Kentucky, have invented certain new and useful Improvements in Ventilators, of which the following is a specification, reference being had therein to the accompanying drawing.

This invention relates to house ventilators and the principal object of the same is to provide a shutter and novel means for retaining the shutter in an open or a closed position relative to the ventilator.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a perspective view of a ventilator constructed in accordance with this invention, the shutter being retained in an open position. Fig. 2 is a fragmentary perspective view showing the shutter retained in a closed position. Fig. 3 is a detail fragmentary perspective view showing the manner of retaining the shutter in an open position. Fig. 4 is a central vertical sectional view showing the shutter closed.

Referring to said accompanying drawings by numerals, 1 designates the ventilator which is especially adapted for walls and like places and which is provided with the usual openings 2 which may be of an ornamental shape. At the center of the upper portion of the ventilator, a vertical slot 3 is formed therethrough the upper end of which communicates with an enlarged opening 4. The ventilator is also provided with a lower vertical slot 5 which is preferably in alinement with slot 3 and which is provided with oppositely disposed side recesses 6. The ventilator is preferably rectangular in shape and is provided with laterally projecting lugs 7 at its corners which are adapted for engagement with the sides of a wall opening in which the ventilator is fitted. At its upper edge, the ventilator is provided with hinge ears 8 to which a shutter 9 is hinged. Said shutter is formed of a solid sheet of material and is of the same size and shape as the ventilator. The upper portion of the inner surface of the shutter is provided with a pair of relatively spaced hinge ears 10 in which the oppositely projecting pivots 11 of a latch are pivotally mounted. Said latch is preferably formed from a single length of wire or rod metal which is doubled to provide a latching loop 12 at its free end, a widened body portion 13, and parallel arms 14 which terminate in said pivots 11. The junction of body 13 with arms 14 provides shoulders 15 which serve as abutments adapted to prevent the shutter being rocked to an open position, and the junction of said body with said latching loop provide similar shoulders 16 which are adapted to prevent the shutter being rocked to a closed position, as will be explained. The shutter is also provided on the lower portion of its inner surface with a centrally located laterally projecting lug 17 the free end of which is provided with a transverse opening 18.

The latch of shutter 9 is freely slidable through the end opening 4 of slot 3, but owing to the size of the body 13 of said latch it cannot move through slot 3. Therefore it will be seen that when shutter 9 is open, as shown in Fig. 1, end loop 11 may be placed in slot 3 with shoulders 16 abutting the edges thereof and thereby retain the shutter open. And when the shutter is closed, arms 14 may be fitted in slot 3 with shoulders 15 abutting the edges thereof, thereby retaining the shutter closed, as is shown in Fig. 2. When in said closed position, lug 17 of the shutter projects through slot 5 of the ventilator and the loop 12 of the latch, and by means of a cotter pin, key, or the like 19 which is passed through opening 18 of said lug, the shutter may be securely locked in a closed position, so that the shutter will be prevented from swinging in windy weather.

What I claim as my invention is:—

1. A device of the character described comprising a ventilator, a shutter hinged thereto, said shutter provided with an upper slot having an enlarged end and a lower slot, a latch carried by said shutter and passed through the enlarged end of the upper slot and provided with means for engaging said slot to retain the shutter in an open or closed position, and locking means carried by said shutter and adapted to be passed through said lower slot and engaged with said latch to lock the shutter closed.

2. A device of the character described comprising a ventilator, a shutter hinged thereto, a latch pivotally connected to said shutter and adapted to engage said ventilator to retain the shutter in an open or a closed position, and means carried by said shutter adapted to be passed through the ventilator and engaged with said latch to lock the shutter in a closed position.

3. A device of the character described comprising a ventilator provided with an upper slot having an enlarged end, a shutter hinged to said ventilator, a latch hinged to said shutter and freely slidable through the enlarged end of said slot, said latch provided with abutment shoulders for engaging said slot to retain the shutter open or closed, and means carried by said shutter adapted to pass through said ventilator for locking engagement with said latch.

4. A device of the character described, comprising a ventilator, a shutter hinged thereto, shutter holding means carried by said shutter for engaging said ventilator to retain the shutter open or closed, a lug carried by said shutter and adapted to pass through said ventilator and engage said shutter means, and means for locking said lug to said shutter holding means.

5. A device of the character described, comprising a ventilator provided with an upper slot having an enlarged end and with a lower slot, a shutter hinged to said ventilator, a latch pivotally connected to said shutter and freely slidable through the enlarged end of said upper slot, said latch having a widened bottom adapted to engage said slot to retain the shutter open or closed, a lug carried by said shutter adapted to be passed through the lower slot of the ventilator and the free end of said latch, and means for locking said lug to said latch.

In testimony whereof I hereunto affix my signature in presence of two witnesses.

THOMAS MARTIN BARBEE.

Witnesses:
WOODFORD LITTLE,
WILLIAM C. BOWLING.

---

Copies of this patent may be obtained for five cents each, by addressing the "Commissioner of Patents, Washington, D. C."